(12) United States Patent
Weber

(10) Patent No.: US 12,217,908 B2
(45) Date of Patent: Feb. 4, 2025

(54) PERMANENT MAGNET FOR USE IN AN ELECTRIC MACHINE WITH ONE OR MORE GROOVES

(71) Applicant: BOMATEC MANAGEMENT AG, Hori (CH)

(72) Inventor: Kurt Weber, Hochfelden (CH)

(73) Assignee: BOMATEC MANAGEMENT AG, Hori (CH)

( * ) Notice: Subject to any disclaimer, the term of this patent is extended or adjusted under 35 U.S.C. 154(b) by 286 days.

(21) Appl. No.: 17/790,576

(22) PCT Filed: Jan. 7, 2020

(86) PCT No.: PCT/EP2020/050194
§ 371 (c)(1),
(2) Date: Jul. 1, 2022

(87) PCT Pub. No.: WO2021/139877
PCT Pub. Date: Jul. 15, 2021

(65) Prior Publication Data
US 2023/0042082 A1    Feb. 9, 2023

(51) Int. Cl.
*H01F 7/02*    (2006.01)
*H02K 1/02*    (2006.01)

(52) U.S. Cl.
CPC .............. *H01F 7/021* (2013.01); *H02K 1/02* (2013.01)

(58) Field of Classification Search
CPC .............. H01F 7/021; H01F 41/0253; H01F 2027/348; H01F 41/0286; H02K 1/2726; H02K 15/03; H02K 1/02; H02K 2213/03
See application file for complete search history.

(56) References Cited

U.S. PATENT DOCUMENTS

2004/0045637 A1\* 3/2004 Tanaka ................. B28D 5/0076
                                                                148/301
2019/0088392 A1\* 3/2019 Azar ......................... H02K 1/27

FOREIGN PATENT DOCUMENTS

| CN | 104377859 A | 2/2015 | |
|---|---|---|---|
| CN | 107394921 A | 11/2017 | |
| EP | 1976096 A2 | 10/2008 | |
| EP | 2760112 A1 \* | 7/2014 | ............... H02K 1/17 |
| EP | 3057207 B1 \* | 10/2018 | ............. B26F 3/002 |
| GB | 708135 A | 4/1954 | |
| WO | WO-2020030241 A1 \* | 2/2020 | |

OTHER PUBLICATIONS

International Search Report from PCT Application No. PCT/EP2020/050194, Sep. 30, 2020.

\* cited by examiner

*Primary Examiner* — Mohamad A Musleh
(74) *Attorney, Agent, or Firm* — Workman Nydegger

(57) ABSTRACT

A one-piece permanent magnet is provided for use in an electric machine. The permanent magnet comprises a groove having a depth d which is equal to the thickness of the permanent magnet. The groove has a meandering or helical course with a subsection having the form of the letter S or the letter Z.

23 Claims, 3 Drawing Sheets

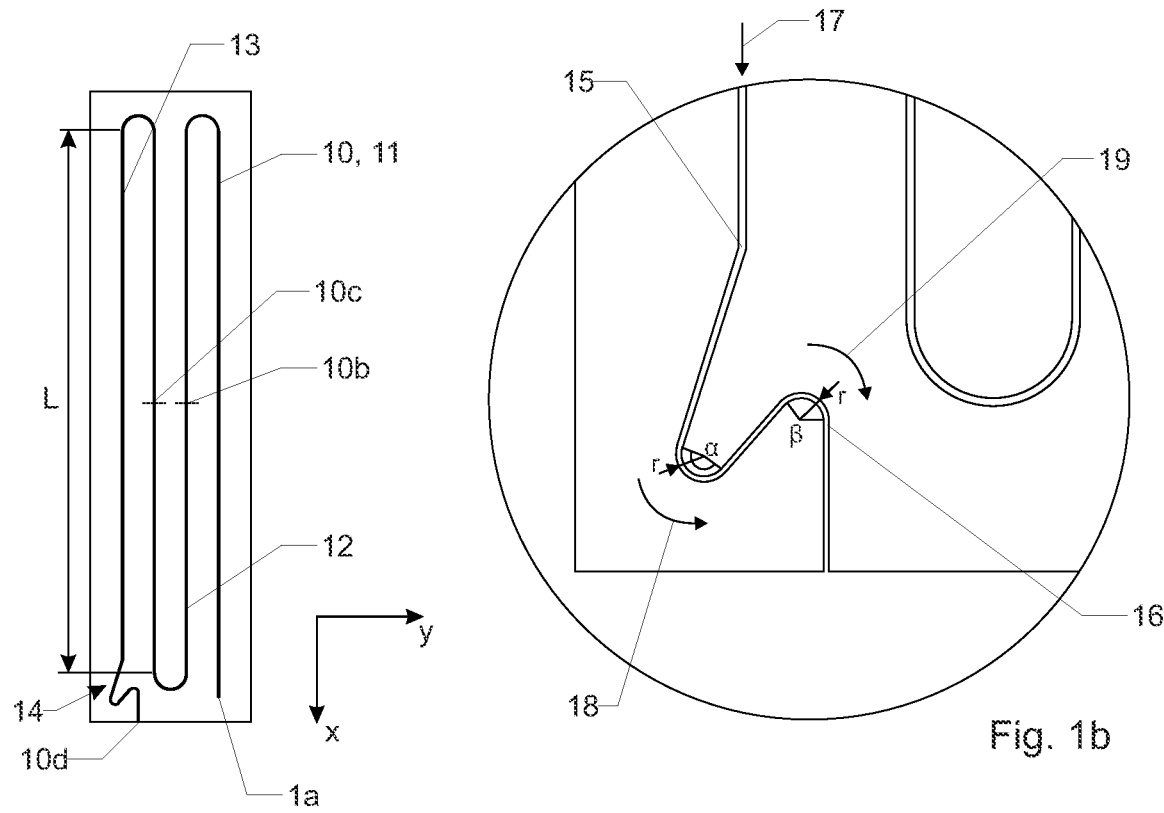
Fig. 1a
Fig. 1b
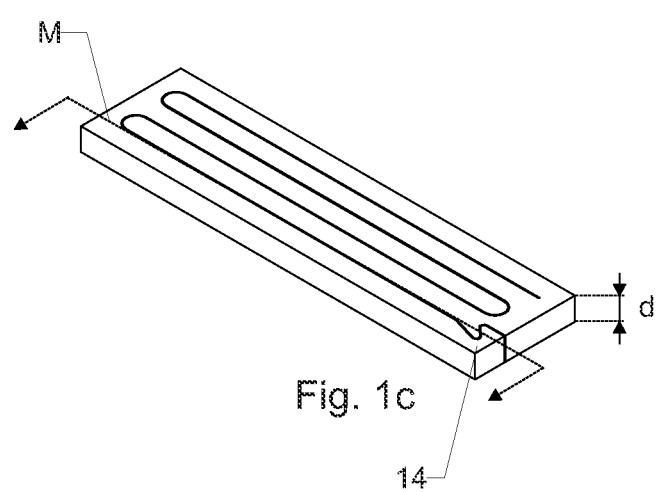
Fig. 1c

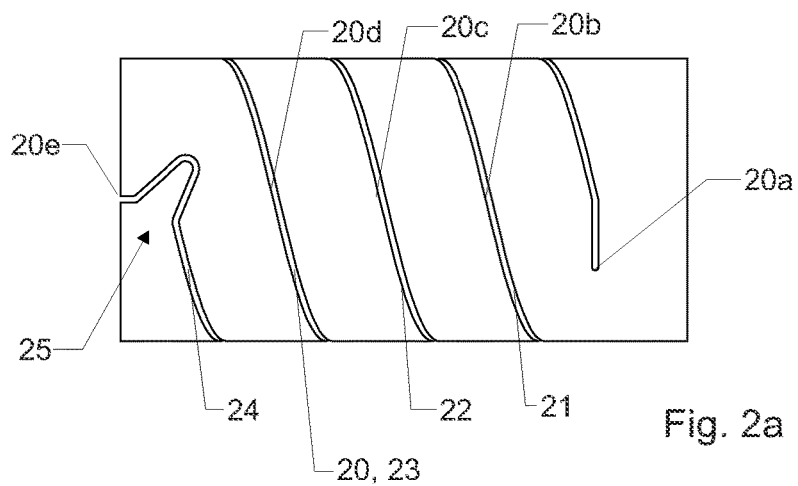
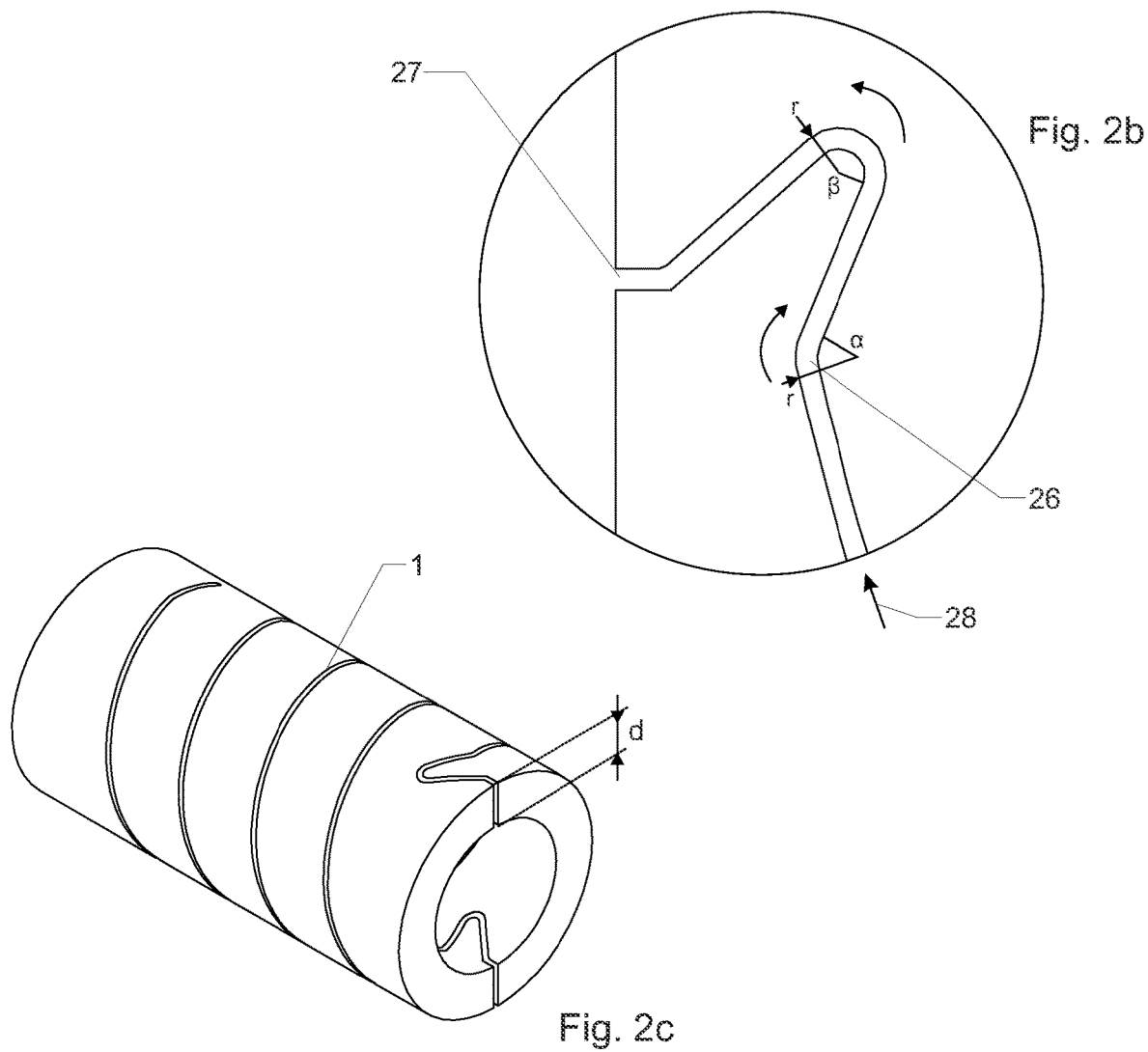

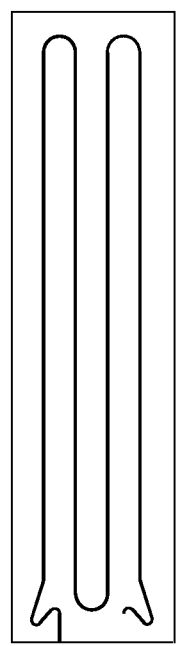 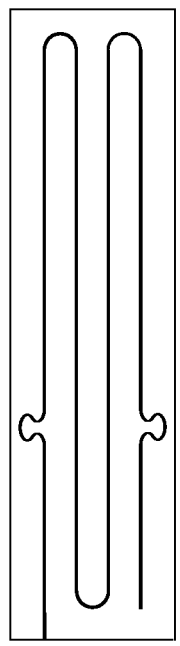 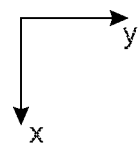
Fig. 3  Fig. 4

PERMANENT MAGNET FOR USE IN AN ELECTRIC MACHINE WITH ONE OR MORE GROOVES

TECHNICAL FIELD

The invention relates to a one piece permanent magnet for use in an electric machine, comprising a groove having a depth d which is equal to the thickness of the permanent magnet.

BACKGROUND ART

Permanent magnet machines, in particular permanent magnet machines with single-tooth windings, often suffer from eddy current losses resulting from eddy currents induced within the permanent magnets. Eddy currents lead to the generation of heat which can result in thermal overloading and failure of the electrical machine. On the one hand the eddy currents are caused by a changing/pulsating magnet field in the air gap of the electric machine, the pulsation of the air gap field depending on the grooving and the current feed of the stator of the electric machine. On the other hand the eddy currents are caused by a changing magnetic flow caused by feeding currents to the single-tooth windings of an electric machine.

To reduce eddy current losses it is known on the one hand to segment the permanent magnets into a plurality of permanent magnet segments that are separate from each other (see for example EP 1 976 096 A2), with the plurality of permanent magnet segments being isolated from each other and bonded together. The number of separate permanent magnet segments depends on the particular geometry of the electrical machine.

On the other hand grooves cut into the permanent magnet by wire erosion cutting. After the groove has been formed in the permanent magnet it may be filled with an insulation material, for example a polymer plastic, and in particular an acrylic plastic.

Disclosure of the Invention

It is an object of the invention to provide a permanent magnet, which is easy to produce and has excellent eddy-current loss properties and mechanical stability for the use in electrical machines.

This object is solved by the independent claims. According to this a one piece permanent magnet for use in an electric machine comprises a groove having a depth d which is equal to the thickness of the permanent magnet. The groove has a meandering course with a subsection having the form of the letter S or the letter Z.

The form of the letter S or the letter Z means, that the course of the groove has at least one direction change of more than 90° in a first direction of rotation, i.e. clockwise or counterclockwise, and another direction change with an arbitrary angle, in particular with an angle of at least 10°, in particular with at least 20°, in particular with at least 45°, in particular with at least 90°, in the opposite direction of rotation.

The groove reduces the eddy current losses of the permanent magnet. The subsection of the groove following the form of the letter S or the letter Z leads to an increased stability of the permanent magnet.

Advantageously, the meandering course comprises a series of regular meanders. The subsection is part of a single meander of the series, in particular part of the first or of the last meander of the series. If the subsection is located at the mechanically most stressed area, the stability is optimally improved.

In particular, the length of the subsection is at least twice as small, in particular three times as small, in particular five times as small, in particular seven times as small, in particular ten times as small, as the whole length of the meander which the subsection is part of. I.e. the subsection is one part of the whole and does not influence the whole course of the groove.

Advantageously, the meanders have a comparable length, and/or the subsection breaks the regularity of the meandering course.

Furthermore, the groove, in particular every meander, can comprise a straight line with a length of at least 30 mm, in particular at least 50 mm, in particular at least 70 mm, in particular at least 100 mm.

Furthermore, this object of the invention is solved by a one piece permanent magnet for use in an electric machine, comprising a groove having a depth d which is equal to the thickness of the permanent magnet, wherein the groove has a helical course. The groove comprises a subsection having the form of the letter S or the letter Z. A helical form with such a subsection increases the mechanical stability of a hollow cylinder.

In case of a permanent magnet of a hollow cylinder, the thickness corresponds to the thickness of the hollow cylinder wall.

Advantageously, the helical course comprises a series of regular helix turns. The subsection is part of a single helix turn of the series, in particular part of the first or of the last helix turn of the series.

Furthermore, the length of the subsection can be at least twice as small, in particular three times as small, in particular five times as small, in particular seven times as small, in particular ten times as small, as the whole length of the helix turn which the subsection is part of.

Advantageously, the helix turns have a comparable length, and/or the subsection breaks the regularity of the helical course.

In a preferred embodiment, the one piece permanent magnet comprises more than one subsection. These subsections can be part of different meanders or different helix turns.

Advantageously, the subsection comprises an arc having a radius of less than 6 mm, in particular of less than 3 mm, in particular of less than 2 mm, in particular of less than 1 mm, in particular of less than 0.75 mm. Furthermore, the subsection can have at least one, in particular at least two, arc angles of more than 90°, and/or having at least one, in particular at least two, direction changes of more than 90°.

In a preferred embodiment the groove is filled with insulation material, in particular a polymer plastic, and in particular an acrylic plastic and the permanent magnet consists of or comprises a material, in particular a sintered material, which consists of or comprises an alloy of neodymium, iron and boron or an alloy of samarium and cobalt.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIGS. 1a to 1c show a first exemplary embodiment of a one piece permanent magnet with a meandering groove;

FIGS. 2a to 2c show a second exemplary embodiment of a one piece permanent magnet with a helical groove;

FIG. 3 shows a third exemplary embodiment; and

FIG. 4 shows a fourth exemplary embodiment.

MODES FOR CARRYING OUT THE INVENTION

The FIG. 1a to 1c show a first exemplary embodiment of a one piece permanent magnet with a cuboid shape. The permanent magnet extends along a plane spanned by the coordinate axes x and y and comprises a thickness d.

The permanent magnet comprises a groove 10 which has a depth equal to the thickness d of the permanent magnet, i.e. the groove 10 extends through the whole thickness of the permanent magnet. The groove 10 has a meandering course comprising a series of three regular meanders 11, 12 and 13. The first meander 11 runs from the first end 10a to point 10b, the second meander 12 runs from point 10b to point 10c and the third meander runs from point 10c to the second end 10d. All meanders 11, 12 and 13 have a comparable length and a comparable form which gives the regularity of the meandering course. The groove has four straight lines with a length approximately of the distance L.

The third meander 13 comprises the subsection 14 having the form of the letter S. The subsection 14 breaks the regularity of the meandering course from point 15 to point 16 and is only part of one single, namely of the third, meander. The third meander is, depending on the perspective the first or the last meander of the series. The subsection 14 comprises two direction changes in opposite direction. Following the groove 1 in the direction indicated by arrow 17, the direction changes at the arc with the angle α counter clockwise, as shown by the arrow 18, and at the arc with the angle β clockwise, as shown by the arrow 19, i.e. in opposite directions. The angle α is approximately 170° and the angle β is approximately 130°, i.e. the direction changes once by 170° and once by 130°. This means that the direction changes at least once by more than 90°. Both arcs with the angles α and β have a radius of approximately 0.5 mm.

The length of the subsection 14 is much smaller as the whole length of the third meander 13 which the subsection 14 is part of. The subsection 14 is approximately eight times smaller than the whole third meander 13.

The described subsection increases the mechanical stability of the permanent magnet. A mechanical stress occurs during application of the permanent magnet in an electrical machine or during magnetization at the manufacturing process. For example, a mechanical force wants to move the foremost part of the permanent magnet, which is encircled by dashed lines in FIG. 1c, in the direction indicated by the arrows shown in FIG. 1c. This results in extreme mechanical stress at position M. But this stress can be reduced since the subsection 14 absorbs mechanical forces due to its course.

The FIGS. 2a to 2c show a second exemplary embodiment of a one piece permanent magnet with a form of a hollow cylinder. The hollow cylinder has a wall thickness d which is equal to the depth of the groove 20, i.e. the groove 20 extends through the whole thickness of the permanent magnet. The groove 20 has a helical course comprising a series of four helix turns 21, 22, 23 and 24. The first helix turn 21 runs from point 20a to point 20b, the second helix turn 22 runs from point 20b to point 20c, the third helix turn 23 runs from point 20c to point 20d and the fourth helix turn 24 runs from point 20d to point 20e. All helix turns 21, 22, 23 and 24 have a comparable length and a comparable form which gives the regularity of the helical course.

The fourth helix turn 24 comprises the subsection 25 having the form of the letter Z. The subsection 25 breaks the regularity of the helical course from point 26 to point 27 and is only part of one single, namely of the fourth, helix turn. The fourth helix turn is, depending on the perspective the first or the last helix turn of the series. Following the groove 20 in the direction indicated by arrow 28, the direction changes at the arc with the angle α clockwise, as shown by the arrow 29, and at the arc with the angle β counter clockwise, as shown by the arrow 30, i.e. in opposite directions. The angle α is approximately 60° and the angle β is approximately 160°, i.e. the direction changes once by 60° and once by 160°. This means that the direction changes at least once by more than 90°.

The length of the subsection 25 is much smaller as the whole length of the fourth helix turn 24.

The FIGS. 3 and 4 show alternative embodiments. FIG. 3 shows an embodiment with two subsections and FIG. 4 shows an embodiment where the one subsection comprises both a letter S and a letter Z directly following each other.

While there are shown and described presently preferred embodiments of the invention, it is to be distinctly understood that the invention is not limited thereto but may be otherwise variously embodied and practiced within the scope of the following claims.

The invention claimed is:

1. A one-piece permanent magnet for use in an electric machine, the one-piece permanent magnet comprising a groove having a depth d which is equal to a thickness of the permanent magnet, wherein the groove has a meandering course with a subsection having a form of a letter S or a letter Z, and wherein the meandering course comprises a series of regular meanders and wherein the subsection having the form of the letter S or the letter Z is part of a single meander of the series.

2. The one-piece permanent magnet according to claim 1, wherein the subsection having the form of the letter S or the letter Z is part of the first or of the last meander of the series.

3. The one-piece permanent magnet according to claim 2, wherein the meanders have a comparable length, and/or the subsection breaks the regularity of the meandering course.

4. The one-piece permanent magnet according to claim 1, wherein a length of the subsection having the form of the letter S or the letter Z is at least twice as small as a whole length of the meander which the subsection is part of.

5. The one-piece permanent magnet according to claim 1, wherein every meander comprises a straight line with a length of at least 30 mm.

6. The one-piece permanent magnet according to claim 1, wherein the groove comprises more than one subsection.

7. The one-piece permanent magnet according to claim 1, wherein the subsection comprises an arc having a radius of less than 6 mm, and/or having at least one arc angle of more than 90°, and/or having at least one direction change of more than 90°.

8. The one-piece permanent magnet according to claim 1, wherein the groove is filled with insulation material, a polymer plastic, and/or an acrylic plastic.

9. The one-piece permanent magnet according to claim 1, wherein the permanent magnet comprises a material, which comprises an alloy of neodymium, iron and boron or an alloy of samarium and cobalt.

10. The one-piece permanent magnet according to claim 9, wherein the permanent magnet comprises a sintered material.

11. The one-piece permanent magnet according to claim 1, wherein a length of the subsection having the form of the letter S or the letter Z is at least seven times as small as a whole length of the meander which the subsection is part of.

12. The one-piece permanent magnet according to claim 1, wherein every meander comprises a straight line with a length of at least 100 mm.

13. The one-piece permanent magnet according to claim 1, wherein the subsection comprises an arc having a radius of less than 6 mm.

14. The one-piece permanent magnet according to claim 1, wherein the subsection comprises an arc having at least one arc angle of more than 90°.

15. The one-piece permanent magnet according to claim 1, wherein the subsection comprises an arc having at least one direction change of more than 90°.

16. A one-piece permanent magnet for use in an electric machine, the one-piece permanent magnet comprising a groove having a depth d which is equal to a thickness of the permanent magnet, wherein the groove has a helical course with a subsection having a form of a letter S or a letter Z, and
wherein the helical course comprises a series of regular helix turns and wherein the subsection is part of a single helix turn of a series.

17. The one-piece permanent magnet according to claim 16, wherein the subsection is part of the first or of the last helix turn of the series.

18. The one-piece permanent magnet according to claim 16, wherein a length of the subsection is at least twice as small as a whole length of the helix turn which the subsection is part of.

19. The one-piece permanent magnet according to claim 16, wherein
the helix turns have a comparable length, and/or
the subsection breaks the regularity of the helical course.

20. The one-piece permanent magnet according to claim 16, wherein the groove comprises more than one subsection.

21. The one-piece permanent magnet according to claim 16, wherein the subsection comprises an arc
having a radius of less than 6 mm, and/or
having at least one arc angle of more than 90°, and/or
having at least one direction change of more than 90°.

22. The one-piece permanent magnet according to claim 16, wherein the groove is filled with insulation material, a polymer plastic, and/or an acrylic plastic.

23. The one-piece permanent magnet according to claim 16, wherein the permanent magnet comprises a material which comprises an alloy of neodymium, iron and boron or an alloy of samarium and cobalt.

* * * * *